(12) United States Patent
Karlsson et al.

(10) Patent No.: US 8,630,767 B2
(45) Date of Patent: Jan. 14, 2014

(54) ESTIMATION OF THE LOAD OF A VEHICLE

(75) Inventors: Rickard Karlsson, Linköping (SE);
Andreas Andersson, Linköping (SE);
Jonas Josefsson, Linköping (SE)

(73) Assignee: Nira Dynamics AB, Linkoping (SE)

( * ) Notice: Subject to any disclaimer, the term of this patent is extended or adjusted under 35 U.S.C. 154(b) by 606 days.

(21) Appl. No.: 12/739,731

(22) PCT Filed: Dec. 3, 2007

(86) PCT No.: PCT/EP2007/010472
§ 371 (c)(1),
(2), (4) Date: Nov. 30, 2010

(87) PCT Pub. No.: WO2009/071104
PCT Pub. Date: Jun. 11, 2009

(65) Prior Publication Data
US 2011/0066322 A1   Mar. 17, 2011

(51) Int. Cl.
*G06F 15/00* (2006.01)
*G06F 17/00* (2006.01)
*G01G 19/03* (2006.01)

(52) U.S. Cl.
USPC ............... 701/35; 701/29; 702/174; 702/175; 706/52

(58) Field of Classification Search
USPC .................. 701/35, 29; 702/174, 175; 706/52
See application file for complete search history.

(56) References Cited

U.S. PATENT DOCUMENTS

| | | | |
|---|---|---|---|
| 4,548,079 A * | 10/1985 | Klatt | 73/865 |
| 5,337,013 A * | 8/1994 | Langer et al. | 324/537 |
| 5,973,273 A | 10/1999 | Tal et al. | |
| 6,072,127 A * | 6/2000 | Oslakovic | 177/136 |
| 6,167,357 A | 12/2000 | Zhu et al. | |
| 6,518,519 B1 * | 2/2003 | Crane et al. | 177/136 |
| 6,998,972 B2 * | 2/2006 | Geisler et al. | 340/439 |
| 7,139,651 B2 * | 11/2006 | Knowlton et al. | 701/50 |
| 7,536,272 B2 * | 5/2009 | Leminoux et al. | 702/173 |
| 8,185,358 B2 * | 5/2012 | Park et al. | 702/198 |
| 8,301,083 B2 * | 10/2012 | Wigren | 455/67.13 |

(Continued)

FOREIGN PATENT DOCUMENTS

| | | |
|---|---|---|
| EP | 1 829 714 | 9/2007 |
| GB | 2 336 683 | 10/1999 |
| JP | 2007187534 A * | 7/2007 |
| WO | WO 03/029764 | 4/2003 |

OTHER PUBLICATIONS

PCT International Search Report and Written Opinion for PCT Counterpart Application No. PCT/EP2007/010472 containing Communication relating to the Results of the Partial International Search Report, 9 pgs., (Aug. 20, 2008).

*Primary Examiner* — Tuan C. To
(74) *Attorney, Agent, or Firm* — Blakely, Sokoloff, Taylor & Zafman LLP

(57) ABSTRACT

A method, an apparatus and a computer program product for estimating the current load of a vehicle wherein a filter bank including a filter for different weight classes, each filter implementing a vehicle model for estimating the current mass of the vehicle. Based on vehicle data indicative of a current driving situation of the vehicle, and filter parameter specific for the respective weight class, each filter provides a load estimation value as filter specific estimation of the current load of the vehicle.

26 Claims, 7 Drawing Sheets

(56) References Cited

U.S. PATENT DOCUMENTS

| | | | |
|---|---|---|---|
| 8,311,970 B2 * | 11/2012 | Mcaree et al. | 706/52 |
| 8,346,438 B2 * | 1/2013 | Breed | 701/45 |
| 2002/0038193 A1 | 3/2002 | Grunberg et al. | |
| 2004/0193386 A1 * | 9/2004 | Flynn et al. | 702/173 |
| 2005/0010356 A1 | 1/2005 | Ishiguro et al. | |
| 2007/0038357 A1 * | 2/2007 | Leminoux et al. | 701/75 |
| 2008/0065352 A1 * | 3/2008 | Coulmeau | 702/175 |
| 2008/0227400 A1 * | 9/2008 | Wigren | 455/67.13 |
| 2009/0187527 A1 * | 7/2009 | Mcaree et al. | 706/52 |

* cited by examiner

ESTIMATION OF THE LOAD OF A VEHICLE

CROSS-REFERENCE TO RELATED APPLICATION

This patent application is a U.S. National Phase application under 35 U.S.C. §371 of International Application No. PCT/EP2007/010472, filed on Dec. 3, 2007, entitled ESTIMATION OF THE LOAD OF A VEHICLE.

FIELD OF THE INVENTION

The present invention generally relates to the estimation of the load of a vehicle and more particularly an estimation of the current mass of a vehicle based on vehicle related information processed by a filter arrangement.

BACKGROUND OF THE INVENTION

Knowing the total weight of a vehicle (i.e. the vehicle's own weight and, if present, the weight of load) is of great interest in many automotive applications. Many control decisions and diagnosis systems can be improved if this parameter can be estimated accurately. For example, an indirect tire pressure monitoring system uses the wheel rolling radius as an indicator of low tire pressure. Since the rolling radius is correlated to the vehicle mass, knowledge of the load in the vehicle is of great importance.

U.S. Pat. No. 5,973,273 discloses to mount, as additional sensors, vertical accelerometers on the vehicle and to look for changes in the vertical displacement's frequency behavior of the vehicle. Here, the need for additional sensors results is a drawback, which also does not allow using this approach in existing vehicles without modification.

US 2002/0038193 A1 discloses to estimate the load of a heavy truck based on information on pressure of an air-suspension system. Since this approach is limited to vehicles having air-suspension, a general application in the automotive field is not possible.

EP 1 829 714 A1 uses tire models together with pressure information from direct tire pressure sensors and the rolling radii of the wheels to calculate the load of a vehicle. This approach is not useful in applications where tire pressure and/or wheel radii are to be determined.

Further approaches include to calculate the vehicle mass based on longitudinal dynamics of a vehicle as disclosed in US 2005/0010356 A1 and vehicle mass estimation using recursive least squares (RLS) filtering as disclosed in U.S. Pat. No. 6,167,357.

Mass calculation based on longitudinal dynamics of a vehicle does not result in reliable mass estimation if, e.g., the vehicle's acceleration and/or the engine's output torque both being used in estimation are low. Using recursive least squares (RLS) filtering requires a considerable time to provide useful results (e.g. in the order of 10 minutes) and is sensitive to sudden changes of driving situations.

OBJECT OF THE INVENTION

It is an object of the invention to provide solutions for a more reliable and faster estimation of the current load of vehicle usable without limitation to specific vehicle types.

SHORT DESCRIPTION OF THE INVENTION

To solve the above object the present invention provides a method, an apparatus and a computer program product each for estimating the current load of a vehicle as defined in the independent claims.

According to an aspect of the present invention there is provided a method of estimating the current load of a vehicle, which method comprises the steps of:
defining at least two weight classes;
providing a filter bank including, for each of the at least two weight classes, a filter, each filter implementing a vehicle model for estimating the current mass of the vehicle;
supplying, to each filter, at least one vehicle data indicative of a current driving situation of the vehicle, and at least one current filter parameter specific for the respective weight class;
determining, by means of each filter, a load estimation value as filter specific estimation of the current load of the vehicle;
determining, for each load estimation value, a current indication whether it can be assumed that the current load of the vehicle belongs to the respective weight class; and
selecting, among all load estimation values, the load estimation value having the best current indication as estimation of the current load of the vehicle for the current driving situation and/or weighing the current indications for the weight classes to obtain an overall load estimation value for the filter bank, wherein the overall load estimation value is used as load estimation for the current load of the vehicle for the current driving situation.

According to another aspect of the present invention there is provided an apparatus for estimating the current load of a vehicle, which apparatus comprises:
a filter bank including at least two filters, each filter implementing a vehicle model for estimating the mass of the vehicle and being associated to one of at least two weight classes;
an input for supplying, to each filter, at least one vehicle data indicative of a current driving situation of the vehicle, and at least one current filter parameter specific for the respective weight class; wherein
each filter is adapted to determine a load estimation value as filter specific estimation of the current load of the vehicle;
determination means being adapted to determine, for each load estimation value, a current indication whether it can be assumed that the current load of the vehicle belongs to the respective weight class; and
means being adapted to select, among all load estimation values, the load estimation value for which the best current indication is determined as estimation of the current load of the vehicle for the current driving situation and/or being adapted to weigh the current indications for the weight classes to obtain an overall load estimation value for the filter bank, wherein the overall load estimation value is used as load estimation for the current load of the vehicle for the current driving situation.

According to another aspect of the present invention there is provided a computer program product comprising program code for carrying out a method, when executed on a processing system, of estimating the current load of a vehicle, which method comprises the steps of:
defining at least two weight classes;
providing a filter bank including, for each of the at least two weight classes, a filter, each filter implementing a vehicle model for estimating the current mass of the vehicle;

supplying, to each filter, at least one vehicle data indicative of a current driving situation of the vehicle, and at least one current filter parameter specific for the respective weight class;

determining, by means of each filter, a load estimation value as filter specific estimation of the current load of the vehicle;

determining, for each load estimation value, a current indication whether it can be assumed that the current load of the vehicle belongs to the respective weight class; and selecting, among all load estimation values, the load estimation value having the best current indication as estimation of the current load of the vehicle for the current driving situation and/or weighing the current indications for the weight classes to obtain an overall load estimation value for the filter bank, wherein the overall load estimation value is used as load estimation for the current load of the vehicle for the current driving situation.

Further aspects, features and advantages of the present invention will become apparent from the below description, the accompanying drawings and the appended claims.

SHORT DESCRIPTION OF THE DRAWINGS

Embodiments of the invention will now be described, by way of example and with reference to the accompanying drawings, in which.

DESCRIPTION OF PREFERRED EMBODIMENTS

Figure 1:
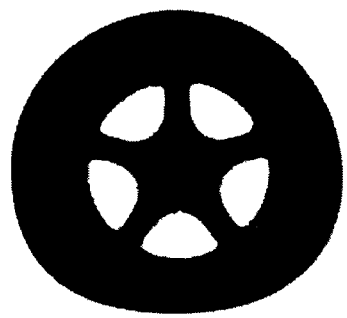
FIG. 1 illustrates a deformed wheel for explanation of a possible application of the present invention.

However, before continuing with descriptions of the drawings, some further observations to further aspects of the present invention are given. More detailed observation to method related aspects of the present invention also apply to the apparatus and computer program related aspects of the present invention even if not explicitly noted.

The present invention relates to estimation of the current load of a vehicle. This implicitly also relates to an estimation of the current weight of the vehicle (i.e. the weight of the "empty" vehicle without load and, if present, the weight of load) since on the basis of the weight of the "empty" vehicle inventive step load can be derived and vice versa.

The at least two weight classes may indicate different ranges of load, wherein these ranges may overlap and may not overlap. These ranges may be used by the respective filters and vehicle models, respectively, for the filter specific load estimations.

The at least two weight classes may also indicated different ranges of overall or total vehicle weights, wherein these ranges may overlap and may not overlap. These ranges may be used by the respective filters and vehicle models, respectively, for the filter specific load estimations.

The step of determining a current indication may include to determine information and/or data representing at least one of a probability, likelihood, covariance and any other statistical value, range or threshold on the basis which it can be assumed that the current load of the vehicle belongs to the respective weight class or not.

The step of determining the load estimation value having the best current indication may include to determine at least one of the load estimation value having the highest probability, the load estimation value having the smallest covariance and the load estimation value having another statistical value indicating that this load estimation value is a better estimation of the current vehicle load as compared with the remaining load estimation values.

The above supplying, load estimation value determining, current indication determining and selecting steps may be repeated. This will allow load estimations to repeated, for example, in order to obtain load estimations specific for different driving situations. A repetition may be also used to recursively operate the filters in order to improve the individual filter estimations and/or the overall estimation of the filter bank. For example, the step repetition may be carried out in predefined time intervals and/or each time the actual mass of the vehicle is to be estimated.

Each filter may comprise at least one of a model-based filter, a Kalman filter, an extended Kalman filter, an unscented Kalman filter, a constraint extended Kalman filter, a particle filter, a sigma-point filter, point-mass filter, a grid-based filter.

The vehicle model may include at least one of the following parameters:

Gearbox efficiency ($\eta_{tm}$);
engine torque ($T_e$);
gearbox damping constant ($\zeta$);
engine angular velocity ($\omega_e$);
engine inertia ($J_e$);
wheel angular velocity ($\omega_w$);
wheel angular acceleration ($\dot{\omega}_w$);
a gear ratio ($i_g$);
a final drive gear ratio ($i_{gf}$);
wheel inertia ($J_e$);
air density ($\rho$);
aerodynamic drag coefficient ($C_d$);
vehicle aerodynamic front area ($A_f$);
vehicle speed (v);
a previously determined load estimation value ($\hat{m}$) from the respective filter;
a previously determined indication whether it can be assumed that the current load of the vehicle belongs to the respective weight class from the respective filter;
the gravitational constant (g);
rolling resistance coefficient ($C_r$); and
wheel radius (r).

The step of supplying at least one vehicle data indicative of the current driving situation may include at least one of a step of supplying an acceleration sensor value (y) indicating a current vehicle acceleration;
a step of supplying an engine torque value ($T_e$) indicating a current torque generated by the vehicle's engine;

a step of supplying at least one wheel angular velocity value ($w_w$) indicating a current angular velocity of at least one vehicle's wheel; and a step of supplying an engine angular velocity value ($\omega_e$) indicating a current angular velocity of the vehicle's engine; and a step of supplying a final drive ratio value ($i_{fd}$) indicating a current final drive ratio.

The step of supplying at least one current filter parameter specific for the respective weight class may include a step of supplying at least one the following filter parameters:

a previous load estimation value of the respective filter;
a previous mean of the respective filter;
a previous covariance of the respective filter; and
a previous probability of the respective filter.

If applicable, the covariance may include at least one of a covariance of a model error of the respective vehicle model and a covariance of measurement noise associated to the at least one vehicle data.

Further, if applicable, the previous mean may be an initial mean assumed for the respective vehicle model or is a mean of the respective vehicle model resulting from a previously carried out step of determining a load estimation value; and/or the previous covariance is an initial covariance assumed for the respective vehicle model or is a covariance of the respective vehicle model resulting from a previously carried out step of determining a load estimation value; and/or the previous probability is an initial probability assumed for the respective vehicle model or a probability of the respective vehicle model resulting from a previously carried out step of determining a current probability.

For example, in the case of an initial mean, the middle mass value of the respective weight class may be used. In the case of an initial covariance, low process noise may be assumed.

The step of determining a current probability that the actual mass of the vehicle belongs to the respective weight class may include a step of using the Bayes' theorem.

The step of determining a current probability that the actual mass of the vehicle belongs to the respective weight class may include a step of calculating the current probability on the basis of a likelihood of the respective load estimation value and a previously calculated probability of the respective weight class.

The likelihood of the respective load estimation value may determined on the basis of estimation of acceleration of the vehicle by exciting the respective vehicle model with at least two different loads of the vehicle wherein the actual vehicle's mass without load is known.

The step of determining a load estimation value may include a step of determining a weight related function, for the respective vehicle model, of a residual between the current load of the vehicle and an load estimation value obtained from the respective vehicle model being excited with the current load of the vehicle.

The step of determining a load estimation value may include a step of determining, for each vehicle model, an uncertainty for the respective load estimation value.

The uncertainty may be determined by at least one of:
an operational mode of a gearbox of the vehicle;
acceleration magnitude; and
engine torque magnitude.

The vehicle model may include a model for the vehicle's acceleration and a model for a vehicle acceleration value provided by a sensor means of the vehicle, the vehicle acceleration value indicating a current acceleration of the vehicle.

The model for the vehicle's acceleration may be based on the following equation:

$$\left(\frac{\eta_{tm}(T_{et} - \zeta\omega_{et}) \cdot i_t}{r} - \frac{\rho C_d A_f}{2} v_t^2\right) \bigg/ \hat{m}_t \gamma_m - gC_r/\gamma_m$$

wherein
$\eta_{tm}$ is a Gearbox efficiency;
$T_e$ is a current engine torque;
$\zeta$ is a gearbox damping constant;
$\omega_e$ is a current engine angular velocity;
$i_t$ is the product of a current gear ratio and a current final drive gear ratio;
$\rho$ is a current air density:
$C_d$ is an aerodynamic drag coefficient;
$A_f$ is the vehicle's aerodynamic front area;
v is the current vehicle speed;
$\hat{m}$ is a previously estimated vehicle load;
$\gamma_m$ is a mass factor for acceleration of the vehicle;
g is the gravitational constant;
$C_r$ is a rolling resistance coefficient; and
r is a current wheel radius.

The model for the vehicle acceleration value may be based on the following equation:

$$\dot{v} + g\sin\alpha/\gamma_m + gC_r\gamma_m$$

wherein
$\dot{v}$ is the vehicle acceleration;
g is the gravitational constant;
$\alpha$ is an angle between the sensor means' measurement axis and the earth's gravity field;
$C_r$ is a rolling resistance coefficient; and
$\gamma_m$ is a mass factor for acceleration of the vehicle.

The model for the output of a sensor means may be based on the following equation:

$$y_{acc} + gC_r/\gamma_m$$

wherein
$y_{acc}$ is a measured acceleration of the vehicle;
g is the gravitational constant;
$C_r$ is a rolling resistance coefficient; and
$\gamma_m$ is a mass factor for acceleration of the vehicle.

The above mass factor $\gamma_m$ may be represented by:

$$1 + \frac{J_{dl}}{m} + \frac{J_e * i_t^2}{m}$$

wherein
m is the current mass of the vehicle;
$J_{dl}$ is the driveline inertia;
$J_e$ is the engine inertia;
$i_t$ is the product of a current gear ratio and a current final drive gear ratio.

In the apparatus of the present invention, each filter may comprise at least one of a model-based filter, a Kalman filter, an extended Kalman filter, an unscented Kalman filter, a constraint extended Kalman filter, a particle filter, a sigma-point filter, point-mass filter, a grid-based filter.

The input for supplying at least one vehicle data may comprise at least one of
an input for receiving an acceleration sensor value (y) indicating a current vehicle acceleration provided by a vehicle sensor;

an input for receiving an engine torque value ($T_e$) indicating a current torque generated by the vehicle's engine; and an input for receiving at least one wheel angular velocity value ($w_w$) indicating a current angular velocity of at least one vehicle's wheel.

an input for receiving an engine angular velocity value ($\omega_e$) indicating a current angular velocity of the vehicle's engine; and an input for receiving a final drive ratio value ($i_{fd}$) indicating a current final drive ratio.

The computer program product of the present invention may comprise program code for carrying out, when executed on a processing system, the method steps referred to above.

The computer program product of present invention may be stored on a computer readable storage medium or being stored in a storage of a processing system.

Many control decisions and diagnosis systems of a vehicle may be improved if the vehicle's mass or load would be known. This, for example, applies to applications involving indirect tire pressure monitoring. In indirect tire pressure monitoring roll radius decrement of the tires is the main indicator that the tire is deflated. However, this may be (also) result from the vehicle's load. Therefore, knowing or estimating the vehicle mass or load can be used, for example, to determine whether a tire is deformed by insufficient tire pressure and/or vehicle load.

A wheel condition as illustrated in FIG. 1 may lead to the assumption that, without knowing the load status of the vehicle, the tire pressure is low. If, on the other hand, it would have been possible to see that the vehicle is heavily loaded, this would probably be considered as the cause of the deformation of the tire.

When estimating the mass of a vehicle using model based parameter estimation, a model of the system where the mass is an important parameter is preferred. The mass may affect many dynamic properties of a vehicle. For example, a large load in the trunk changes the vehicle's understeer gradient, due to the fact that the center of gravity has moved backwards and due to the larger normal force at the tires which gives a smaller side slip.

For the present invention it is preferred to use relations of longitudinal force acting on a vehicle. Longitudinal dynamics during acceleration of a vehicle may be expressed on the basis of Newton's second law. Further, information on longitudinal dynamics is generally available in form of data and/or signals from vehicle sensors already installed vehicle sensors whereby no additional hardware needs to be added.

In order to achieve good estimations of the vehicle's mass and, if applicable, its load (i.e. a weight deviation from the actual vehicle mass) models describing relations between driving situations and vehicle mass should be as accurate as possible and/or feasible (e.g. from a computational point of view). In the description of preferred embodiments, a longitudinal dynamics model is used. More particular, preferred embodiments described here employ vehicle longitudinal dynamics during acceleration.

Models suitable for that purpose describe physical relations between the input signals and measured values. That is, in a longitudinal dynamics model, the relation between, one the one hand, the engine torque as "input signal" and, on the other hand, vehicle speed and acceleration as "measured values".

Assuming the vehicle to be a solid body, forces resulting in an certain acceleration may expressed according to Newton's second law of bodies in motion $$m\dot{v}=F_{net} \quad (1.1)$$

Tractive forces accelerating a vehicle is the engine torque acting through the transmission and the wheels down to the road, using the friction between the wheels and the road to give the vehicle a force forward as well as, if the vehicle is going down a hill, the longitudinal component of the force of gravity m*g*sin($\alpha$) where $\alpha$ being the road slope angle is said to be negative resulting in accelerating forces.

Forces decelerating the vehicle include air resistance, rolling resistance and, if the vehicle is going up a hill the longitudinal component of the force of gravity m*g*sin($\alpha$) where $\alpha$ being the road slope angle is said to be positive resulting in decelerating forces.

Figure 2:
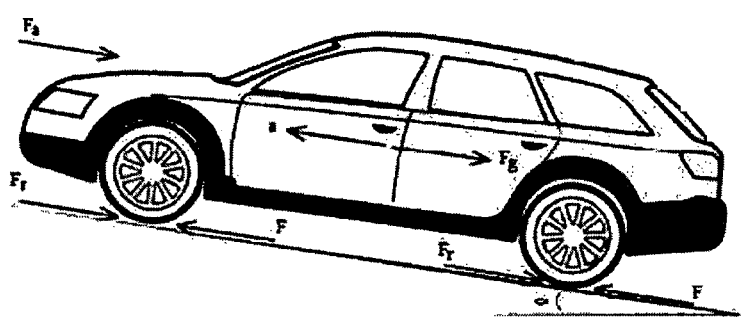
FIG. 2 illustrates forces acting on a vehicle driving on a slope.

FIG. 2 illustrated such accelerating and decelerating forces, in which F indicates tractive forces, $F_a$ indicates decelerating forces resulting from air resistance (i.e. air resistance forces), $F_r$ indicates the rolling resistance, $F_g$ indicates forces resulting from the force of gravity acting on the vehicle and a indicates the resulting acceleration of the vehicle. Using Newton's second law yields:

$$m\dot{v}=F-F_a-F_r-F_g \quad (1.2)$$

In FIG. 2, acceleration acting on the vehicle is also divided into the vehicle body acceleration in comparison to the road, $\dot{v}$ and the component of the earth gravity g*sin $\alpha$ acting in the vehicle's longitudinal direction. When driving up a hill at a constant speed, the vehicle is influenced by the earth's gravity field just like acceleration on a flat road with the difference that the rotating parts, wheels, drive line and engine do not have an angular acceleration.

Figure 3:
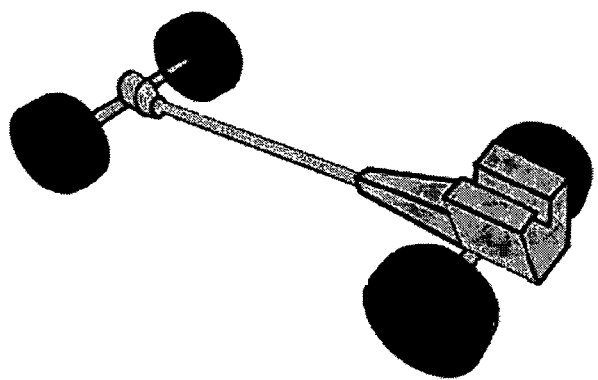
FIG. 3 illustrates a drive train of a vehicle.

An expression for each one of the forces may be derived on the basis of tractive forces F by modeling the vehicle's drivetrain illustrated in FIG. 3 as described below and also on the basis external forces as described further below.

For modeling the engine, is may be take into account that torque delivered from the engine suffers from losses on its way through the transmission down to the ground. When accelerating, engines forces intended for accelerating the vehicle will be used, usually for a lager part, for accelerating the vehicle's mass. However, engine forces will be also consumed by parts of the drivetrain propagating forces to the wheels; e.g. force may be consumed by angular acceleration of the rotating parts like the engine, propeller shaft and wheels. The inertias for such parts are denoted $J_e$ (inertia of the engine), $J_{ps}$ (inertia of the propeller shaft), and $J_w$ (inertia of the wheels). When accelerating on a flat road, torque is lost due to angular accelerations of the engine $\dot{\omega}_e$ (engine angular acceleration) and the wheels $\dot{\omega}_w$ (wheel angular acceleration). According to Newton's second law for rotational acceleration the torque T for accelerating a mass (body) having an inertia J such that the mass is given an angular acceleration $\dot{\omega}$ is $$T=J\dot{\omega} \quad (1.3)$$

Hence, the torque delivered from the engine to the gearbox is $$T_{gb}=T_e-J_e\dot{\omega}_e \quad (1.4)$$

wherein $T_{gb}$ denotes the torque delivered to the gearbox, $T_e$ denotes the torque generated by the engine, $J_e$ denotes the engine's inertia and $\omega_e$ denotes the engine's angular acceleration.

The torque acting on the propeller shaft is the input torque $T_{gb}$ to the gearbox multiplied by the gear ratio. However, there are also losses in the gearbox due to, e.g., friction between gear teeth and friction in bearings and seals. This can be modeled as a constant efficiency loss proportional to the input torque $T_{gb}$. Further, there may be also viscous losses in the gearbox and the final drive. They vary typically with rotational speed of the gearbox so they are modeled as a viscous damping, proportional to the rotational speed. This leaves the torque output from the gearbox modeled with the gear ratio $i_g$, the gear box efficiency modeled as a proportional efficiency $\eta_{tm}$ and as a viscous damping with damping coefficient $\zeta$. This may be expressed as $$T_{ds}=(\eta_{tm}T_{gb}-\zeta\dot{\omega}_e)*i_g=(\eta_{tm}(T_e-J_e\dot{\omega}_e)-\zeta\dot{\omega}_e)*i_g \quad (1.5)$$

Considering inertia of the propeller and drive shafts $J_{ps}$ and inertia of the wheels $J_w$ and that torque output of the wheels depends on the final drive gear ratio $i_{gf}$, the wheels torque $T_w$ may be expressed by:

$$T_w=(\eta_{tm}(T_e-J_e\dot{\omega}_e)-\zeta\dot{\omega}_e)*i_g-J_{ps}\dot{\omega}_{ps}*i_{gf}-J_w\dot{\omega}_w \quad (1.6)$$

wherein $\dot{\omega}_{ps}$ denotes angular acceleration of the propeller and drive shafts and $\dot{\omega}_w$ denotes angular acceleration of the wheels.

Assuming that the final drive gear ratio $i_{gf}$ is constant, overall inertia of propeller and drive shafts and wheels can be expressed by $$J_{dl}*\dot{\omega}_w=J_{ps}*i_{gf}^2+J_w$$

while the product of the final drive gear ratio $i_{gf}$ and the gear ratio $i_g$ can be commonly denoted by $i_t$.

Then, the resulting tractive force F can be expressed by the resulting wheels torque $T_w$, divided by the wheel radius r:

$$F = \frac{T_w}{r} = \frac{(T_e - J_e\dot{\omega}_e)*i_t - J_{dl}\dot{\omega}_w}{r} \quad (1.7)$$

It is noted that for the above expression of tractive force F no longitudinal slip is assumed; this is feasible because under normal driving conditions the slip is normally below 2%.

The aerodynamic resistance $F_a$ is proportional to the square velocity v and may be expressed as $$F_a = \frac{A_f * C_d \rho}{2} * v^2 \quad (1.8)$$

wherein $A_f$ denotes the vehicle aerodynamic front area, $C_d$ denotes the rolling resistance coefficient and $\rho$ denotes air density.

The rolling resistance $C_d$ can be modeled in various, more or less complex, ways. Here is assumed that the rolling resistance force is proportional to the normal force with a proportional constant $C_r$. Denoting the angle of the road inclination $\alpha$ yields the following expressions:

$$F_r=C_r mg,$$

$$F_g=mg \sin(\alpha)$$

Summarizing equations (1.2), (1.7), (1.8) and (1.9) and replacing $\dot{\omega}_w*i_g i_{gf}$ yields the resulting equation:

$$\dot{v} + g\sin(\alpha) + gC_r = \quad (1.12)$$
$$\left(\frac{(\eta_{tm}T_e - \zeta\dot{\omega}_e - J_e\dot{\omega}_w i_t)\cdot i_t - J_{dl}\dot{\omega}_w}{r} - \frac{\rho C_d A_f}{2}v^2\right)/m$$

There is a possibility to rewrite $\dot{\omega}_e$ as $\dot{v}*i_g i_{gf}/r$ and $\dot{\omega}_w$ as $\dot{v}/r$ and the resulting expression becomes:

$$\dot{v}\left(1 + \frac{J_{dl}}{mr^2} + \frac{J_e \cdot i_t^2}{mr^2}\right) + g\sin\alpha + gC_r = \quad (1.13)$$
$$\left(\frac{(\eta_{tm}T_e - \zeta\dot{\omega}_e)\cdot i_t}{r} - \frac{\rho C_d A_f}{2}v^2\right)/m$$

The factor $$1 + \frac{J_{dl}}{m} + \frac{J_e * i_t^2}{m}$$

is denoted $\gamma_m$ and is called the Mass factor when accelerating. An approximation for passenger vehicles is $\gamma_m=1.04+ 0.0025*i_t^2$. The mass factor is mass dependent, and when estimating a vehicle's mass using this as a parameter a mass dependency is lost.

The term $g*\sin \alpha$ is also divided with $\gamma_m$, which means that road grade information is needed to compensate this. This approach works fine on flat roads when the mass dependency of $\gamma_m$ and the road grade may be neglected and if no bias error in the accelerometer may be assumed, it has the advantage that the wheel speeds do not have to be differentiated to get $\dot{\omega}_w$ and $\dot{\omega}_e$:

$$\dot{v} + g\sin(\alpha)/\gamma_m + gC_r/\gamma_m = \left(\frac{(\eta_{tm}T_e - \zeta\dot{\omega}_e)\cdot i_t}{r} - \frac{\rho C_d A_f}{2}v^2\right)/\gamma_m m \quad (1.14)$$

Vehicles usually are equipped with sensor means comprising, inter alia, a longitudinal accelerometer. The accelerometer registers the vehicles actual acceleration/retardation as well as it registers the component $g*\sin \alpha$ of the gravity field when the sensor is not perpendicular to the earth's gravity field: Either the vehicle is going downhill or uphill and the sensor registers the gravity component of the acceleration, or the vehicle is affected by a pitching torque due to acceleration or a load in the trunk and the suspension is compressed/ retracted, giving the vehicle a pitch angle. The different effects are separated by naming the angle in the first case $\alpha_{slope}$ and the angle in the other case $\alpha_{pitch}$. Furthermore the accelerometer is assumed to have a bias error denoted b and sensor noise v(t). The model of the longitudinal accelerometer becomes $$y=\dot{v}+g \sin \alpha_{slope}+g \sin \alpha_{pitch}+b+v(t) \quad (1.15)$$

The equation can be re-formulated without explicitly calculating the angular acceleration as:

$$i_g = \frac{\omega_e}{\omega_w i_{fd}} \quad (1.16)$$

Figure 4:
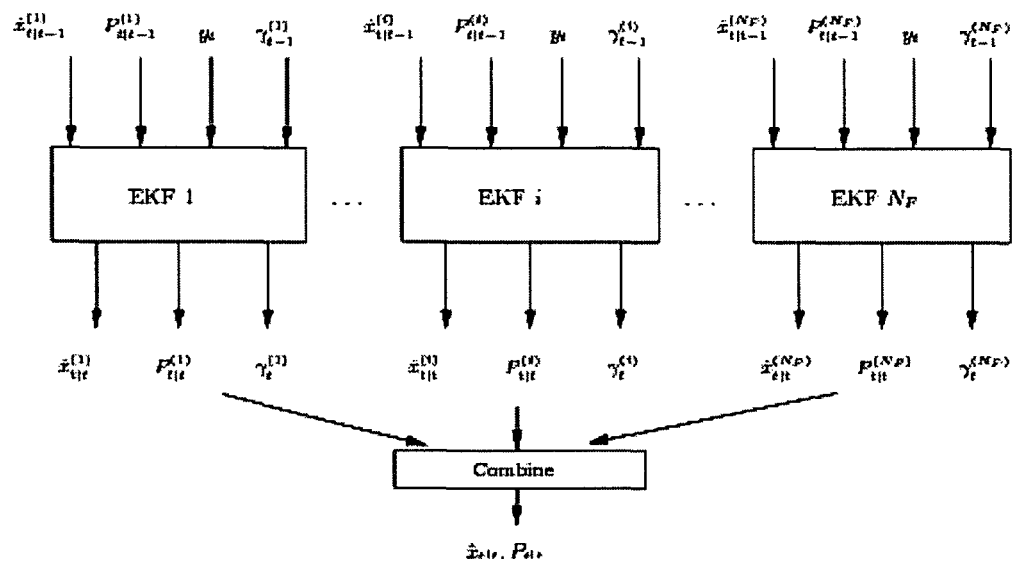
FIG. 4 illustrates a filter bank according to the present invention.

The above models, at least parts thereof, may be used to implement the present invention. In the following, it will be referred to embodiments employing a multiple-model or filter bank solution with different models/filters, each tailored for a certain (true) parameter set (for instance different mass assumptions). The probability for each filter can be recursively computed as more observations arrive, for instance accelerometer signals. FIG. 4 illustrates schematically such a filter bank including several filter each implementing a filter specific vehicle model. Each filter and its vehicle model, respectively, will be recursively updated to improve its load estimation and/or the overall estimation provided by the filter bank as a whole. More particular, FIG. 4 illustrates an exemplary filter bank having extended Kalman filters EKF each of which employing an sensor acceleration value y as measurement value as vehicle data indicative of a current driving situation and a previously determined filter mean x, covariance P and probability $\gamma$ as filter parameters. The filters can be used recursively each independent to produce a point estimate, or they could interact and mix with each other.

For calculating the probability of the true mass belonging to a weight class, here as exemplary embodiment, the Bayes' theorem is used. Given an observation, Bayes' theorem makes it possible to calculate the probability of a statement being true. This is done by the knowledge of the probability of that observation being true when the statement is true and given prior knowledge of the statements probability:

$$p(W \mid y) = \frac{p(y \mid W, I) \cdot p(W, I)}{p(y)} \quad (2.1)$$

In the case of mass estimation this can be interpreted as the probability that the true mass belongs to the tested weight class. It can be calculated from the likelihood of the current observation for the current weight class, and the prior knowledge, that is the calculated probabilities of the weight classes before this sample. The denominator is a scaling factor for that the probabilities sum up to one $$p(y)=p(W|y)+p(\neg W|y) \quad (2.2)$$

In this case, after the probabilities for all weight classes are calculated the results are normalized with the sum. To this end, the likelihoods for the observations are required. One method could be to calculate the estimated acceleration using the model assuming there is no load. This could be done for different test cases with various loads where the true weight is known. The distribution of the respective residuals could then be interpreted as the probability function for the observations in each weight class.

Figure 5:
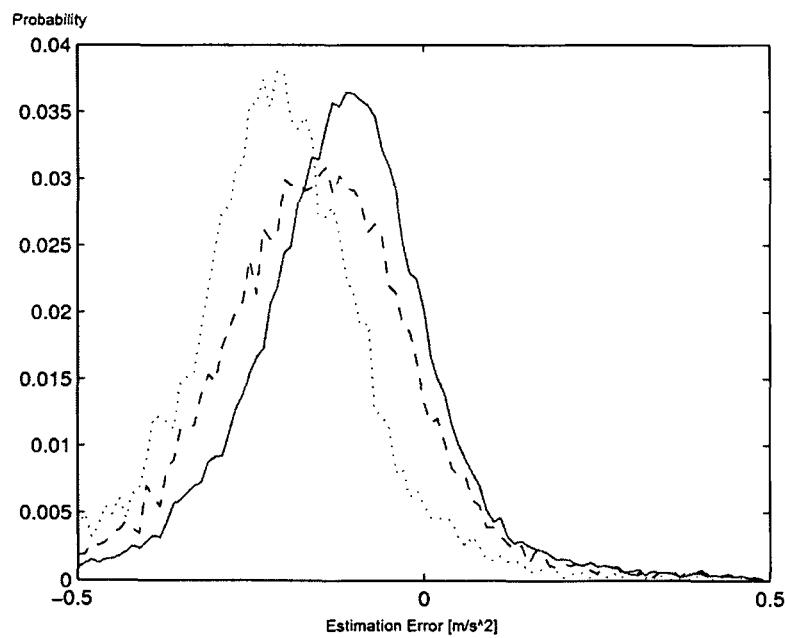
FIG. 5 shows a graph illustrating distribution of residuals of a model for different weight classes according to the present invention.

Exemplary distributions of such a kind are illustrated in FIG. 5, where test cases have been divided into three weight classes and the distribution of the model residuals has been calculated using the same mass (no load) when simulating the model. This skews the distributions to the left for higher loads. The distribution of the residuals gives the probabilities for the particular model error to arise in each weight class when the weight is assumed to be zero.

The approach above can be seen as if there were several models, each one modeling a different system state which is likely to happen. Then, is should be determined which one of them that seems to correspond to the true system. As seen in FIG. 5, the total distribution of the model error, when the weights are discretized into a number of weight classes, can be approximated with the sum of several narrower Gaussian distributions. To estimate the current weight, it is possible to weigh the residual of the measurement against the different Gaussian humps. This leads to the Gaussian Sum filter $$p(x \mid y) \approx \sum_{i=1}^{N} \alpha_i N(x; \hat{x}^{(i)}, P^{(i)}) \quad (2.3)$$

wherein $y-\hat{y}$ is the residual of the filter and is $N(x,y-\hat{y},S_i)$ the Gaussian (normal) density with the covariance $S_i$.

In preferred embodiments, as model-based filter, an extended Kalman filter (EKF) may be used. Given a nonlinear discrete time model, this type of filter can be expressed by:

$$x_{t+1}=f(x_t,u_t)+v_t$$

$$y_t=h(x_t,u_t)+e_t \quad (2.4)$$

Wherein Q and R are the covariance matrices of the process and measurement noise respectively. The linearization is done by calculating the Jacobians of f and h. They are typically given by $$F_t = \nabla_x f(x,u)|_{x_t=\hat{x}_{t|t-1}, u=u_t} = \begin{bmatrix} \frac{\partial f_1}{\partial x_1} & \cdots & \frac{\partial f_1}{\partial x_n} \\ \vdots & \cdots & \vdots \\ \frac{\partial f_m}{\partial x_1} & \cdots & \frac{\partial f_m}{\partial x_m} \end{bmatrix} \quad (2.5)$$

$$H_t = \nabla_x h(x,u)|_{x_t=\hat{x}_{t|t}, u=u_t} = \begin{bmatrix} \frac{\partial h_1}{\partial x_1} & \cdots & \frac{\partial h_1}{\partial x_n} \\ \vdots & \cdots & \vdots \\ \frac{\partial h_m}{\partial x_1} & \cdots & \frac{\partial h_m}{\partial x_m} \end{bmatrix} \quad (2.6)$$

Measurement update
$$L_t = P_{t|t-1} H_t^T,$$
$$S_t = H_t L_t + R_t,$$
$$K_t = L_t S_t^{-1},$$

$$\epsilon_t = y_t - h(\hat{x}_{t|t-1}, u_t), \quad (2.6)$$
$$\hat{x}_{t|t} = \hat{x}_{t|t-1} + K_t \cdot \epsilon_t,$$

Time update
$$\hat{x}_{t+1|t} = f(\hat{x}_{t|t}, u_t),$$
$$P_{t+1|t} = F_t P_{t|t} F_t^T + Q_t$$

where P is the covariance matrix of the estimation error.

Further, according to preferred embodiments, an approach that may be compared with a Range Parameterized Extended Kalman Filter (RPEKF) can be used. Particularly, one Kalman filter is used for each weight class with the initial weight set to the middle value of that weight class and with the process noise assumed to be low. Each filter will be slow and insensitive to sudden model errors but the algorithm can be really fast when the closest filter is chosen from the beginning. Another advantage is that the filters can be different, optimized to work for a certain criteria.

When the load is divided into n weight classes, and a number of n extended Kalman filters are running, the probability for each filter being the best one is calculated based on the assumption that the process noise is Gaussian. A Gaussian distribution function with mean μ and standard deviation σ is:

$$g(x) = \frac{1}{\sqrt{2\pi\sigma^2}} e^{-\frac{(x-\mu)^2}{2\sigma^2}} \quad (2.7)$$

when the model is simulated with the true mass, the model error is assumed to have a Gaussian distribution with mean a=0. That means that the residuals should have a Gaussian distribution with mean μ=0, if the estimated mass equals the true mass. The standard deviation of the predicted estimate is described by the covariance matrix P. To get the standard deviation of the residuals, P needs to be projected down to the measurement room and the measurement uncertainty needs to be added, this is exactly what is described by the matrix S in (2.6). This yields the likelihood functions of the residuals for each filter in the filter bank $$p^i(\epsilon_t^i | m \in w^j) = \frac{1}{\sqrt{2\pi \det S_t^i}} e^{(-\frac{1}{2}\epsilon_t^{iT} S^{-1} \epsilon_t^i)} \quad (2.8)$$

In order to calculate the likelihood of the weight class, the Bayes' theorem yields:

$$p_t^i(m \in w^j | \epsilon) = \frac{p^i(\epsilon_t^i | m \in w^j) \cdot p_{t-1}^i(m \in w^j)}{\sum_{i=0}^{n} p_t^i(m \in w^i | \epsilon)} \quad (2.9)$$

In order to get the estimate and covariance of the total filter the probabilities could be weighed together according to:

$$\hat{x}_t = \sum_{i=0}^{n} p_t^i(m \in w^j) \hat{x}_t^i \quad (2.10)$$

$$P_t = \sum_{i=0}^{n} p_t^i(m \in w^j)(P_t^i + (\hat{x}_t^i - \hat{x}_t)(\hat{x}_t^i - \hat{x}_t)^T)$$

Figure 6:
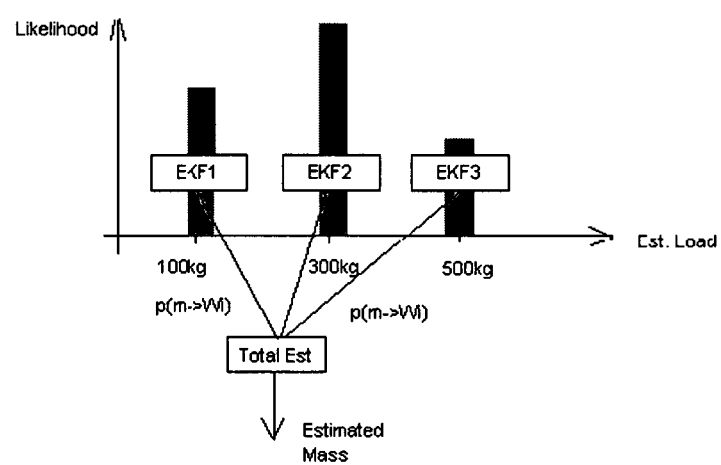
FIG. 6 shows a diagram illustrating likelihoods vs. estimated vehicle masses and loads, respectively, for a preferred embodiment of the present invention.

This can be also derived from FIG. 6, which illustrates the use of a filter bank having filters associated to different weight classes. The resulting likelihood of each filter being true is determined on the basis of the assumption that the measurement noise is Gaussian distributed. Then, the likelihoods are weighted together to determine the estimated vehicle load or mass, respectively, and the total filter covariance.

In further embodiments, the most likely filter could be used as the estimate which will make the filter faster from start when all filters are equally probable.

Another advantage when working with likelihoods is that the model uncertainty is easy to weigh in. It is possible to let the filter hold a estimation more likely if the sample is taken during circumstances that are in favor of the model, than a sample collected at a state where the model often has model errors. Take for example the uncertainty in the gearbox model. When the gearbox goes into lockup mode, the model is rather good but the gearbox goes rarely into lockup mode in city traffic. This makes it difficult to run the filter only when this happens as very few samples will be collected leaving the statistic certainty low. On the other hand can the filter believe strongly on a sample if the gearbox goes into lockup mode. It can also be very suspicious against samples collected when the torque input is heavily increasing or the model has low excitation In (2.8) it is then possible to add the model uncertainty. Let the measurement noise covariance R or the model error covariance Q be dependent of the model state. If the covariances are made bigger for states where the model is likely to be uncertain, S will grow and the probability will be smaller. Using this approach many samples will be collected and an estimate will be given but the filter will be rather slow and uncertain until a favorable state arises and the filter will move fast against the correct filter. The model state has been classified into three levels: poor, good and best model accuracy. This is done by letting criteria like the transmission lockup state, acceleration magnitudes and torque magnitude and derivative classify the model state probability. This classification has improved the algorithms robustness and solves some of the problems with model uncertainty versus the model complexity and the compromise between model uncertainty and statistical uncertainty when many samples are thrown away.

Putting (1.12) onto the discrete state-space model form as in (2.4) yields:

$$\hat{m}_{t+1} = \hat{m}_t \quad (2.11)$$

$$y_t = \left(\frac{\eta_{tm}(T_{et} - \zeta\omega_{et}) \cdot i_t}{r} - \frac{\rho C_d A_f}{2} v_t^2\right) / \hat{m}_t \gamma_m - gC_r/\gamma_m$$

where the measurement is $y_t = \dot{v} + g^* \sin \alpha/\gamma_m + gC_r\gamma_m \approx y_{acc} + gC_r\gamma_m$ and the Jacobians are $$F_x = 1, \quad (2.12)$$

$$H_x = -\left(\frac{\eta_{tm}(T_e - \zeta\omega_e) \cdot i_t}{r} - \frac{\rho C_d A_f}{2} v^2\right) / (\hat{m}^2 \gamma_m)$$

Figure 7:
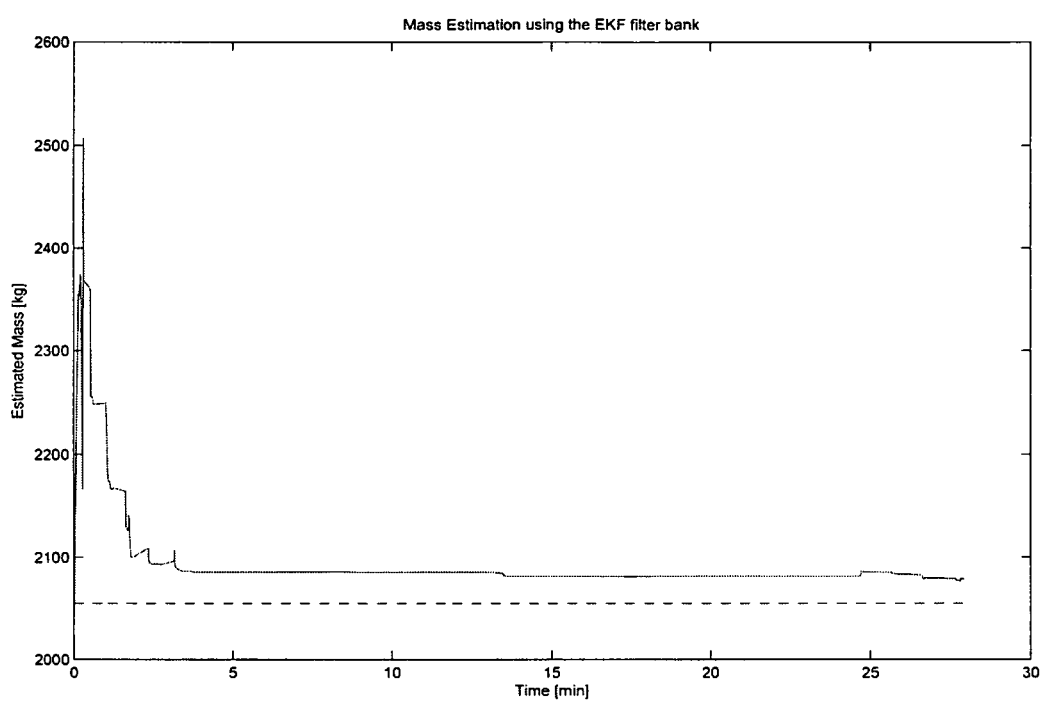
FIG. 7 illustrates results of load/mass estimation with a preferred embodiment of the present invention.
Figure 8:
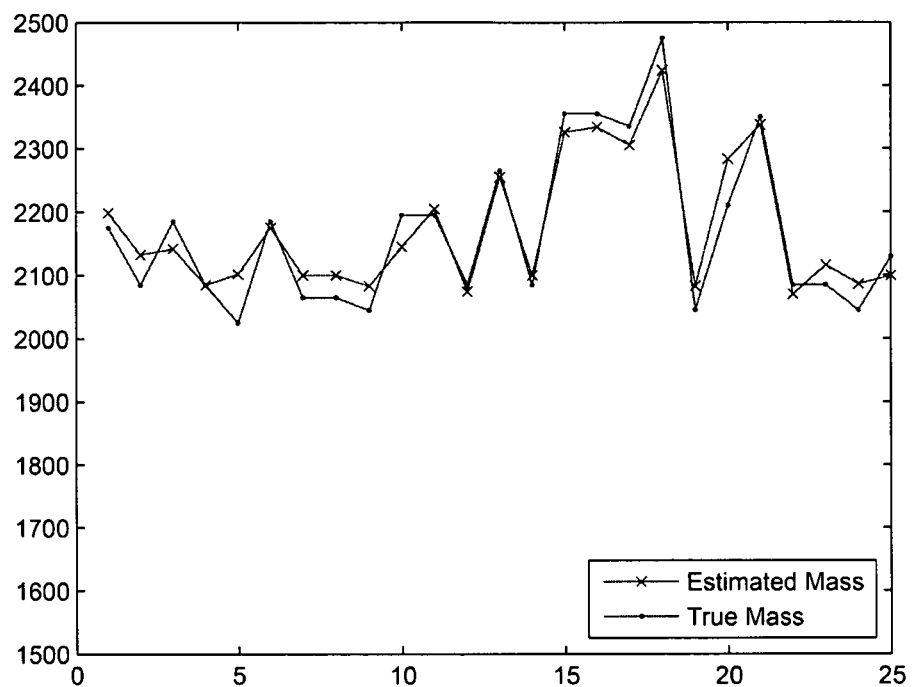
FIG. 8 illustrates results of load/mass estimations according to the present invention in comparison with respective actual vehicle masses.

FIG. 7 illustrates results of a mass estimation using a filter bank algorithm. It can be seen how the different filters are chosen at startup of the algorithm. The results have been obtained on the basis 5 filters. At first, the filter with the highest load has the highest likelihood but the algorithm starts choosing the filters with lower weight as more likely and the filter is stepping down to the lowest weight class at about 2080 kg. Then as the true mass in this case was a bit lower than the lowest weight class, the filter is slowly moving towards the true value. The estimation error is nevertheless not more than 25 kg when the correct filter is chosen. After a long time, all filters will move towards the true value even though they move slowly.

The results from the testcases using the EKF filter bank show how the algorithm fulfills all the criteria posted in the beginning of this chapter. The algorithm moves fast against the correct value, extremely fast when all the criteria for best model probability classification are fulfilled. Further, it is insensitive against sudden model errors as each EKF filter is very slow and during large model errors, all filters will have low probability. The performance of the algorithm is somehow based on how the car is driven during the convergation time of the filter. If the more favorable model states are fulfilled from the beginning the filter often finds the correct filter immediately. The measure of how fast the algorithm is set as the time from start until the filter has a smaller variation then a certain value.

$$Y = (y(t_0)y(t_1) \ldots y(t) \ldots y(t_n)), \quad (2.13)$$

$$\tau = \min_t \left(\max(\hat{Y}) - \min(\hat{Y}) < v\right) - t_0$$

If the variation v is set to be 50 kg, the algorithm is, for the most of the test cases, fast enough to find the mass within 100 kg from the correct value in a time below 5 minutes, i.e. a correct value in a time below 5 minutes. This is also illustrated in FIG. 7 which shows results of 25 testcases under normal driving conditions including, e.g., city traffic and highway speed.

Figure 9:
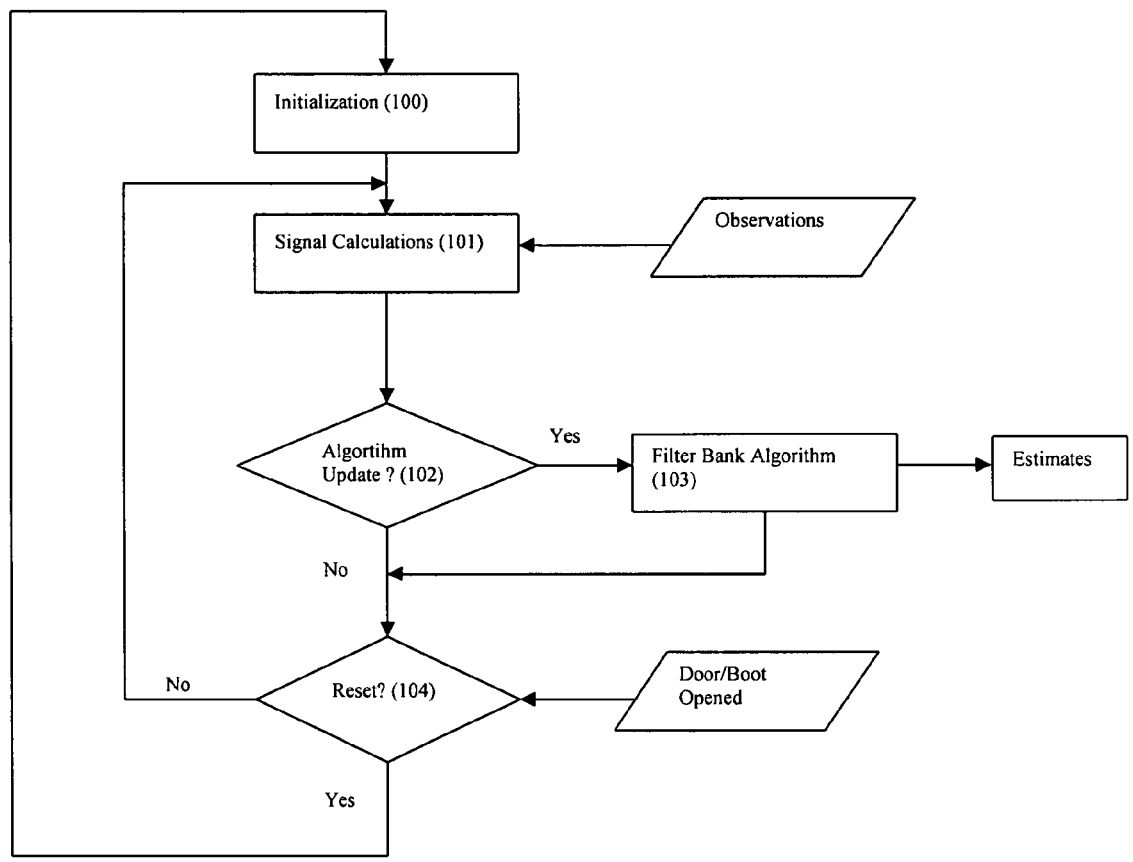
FIG. 9 shows a flow diagram of a preferred embodiment of the present invention.

FIG. 9 shows a flow diagram illustrating an exemplary embodiment of the method and/or an exemplary operation of the apparatus of the present invention.

In step (100), the method and/or the apparatus is initialized, wherein filter probabilities may be initialize from a given prior, together with first and second order statistics for each filter.

In step (101), measurements and filter information are used to compute physical signals such as gear ratio, vehicle speed etc.

In step (102), it determined whether the load estimation(s) should be updated or not. For example, update may be carried out if the current driving situation and/or vehicle condition allows reliable load estimation. For example, no update may be carried out if the vehicle's acceleration, engine torque, speed, yaw rate and/or lateral acceleration and/or braking and/or gear shift operations may be assumed to result in sub-optimal or not reliable load estimation.

In step (103), the filters (i.e. the filter bank) are used to provide their load estimations utilizing information from the vehicle (e.g. acceleration sensor information, wheel velocity/acceleration information, speed information, engine torque information, gear (ratio) information etc.) and filter specific information (e.g. probability and/or covariance). Further, in step (103) the filters (i.e. the filter bank) may be updated, e.g. by being recursively operated.

In step (104), the process flow may be reset. A reset may take place, for example, if a vehicle door is opened and/or in case of a standstill of the vehicle and/or any situation where a load change might be possible.

What is claimed is:

1. A method of estimating the current load of a vehicle, comprising:
   defining at least two weight classes;
   providing a filter bank including, for each of the at least two weight classes, a filter, each filter implementing a vehicle model for estimating the current mass of the vehicle;
   supplying, to each filter, at least one vehicle data indicative of a current driving situation of the vehicle, and at least one current filter parameter specific for the respective weight class;
   determining, by means of each filter, a load estimation value as filter specific estimation of the current load of the vehicle;
   determining, by a processor, for each load estimation value, a current indication whether it can be assumed that the current load of the vehicle belongs to the respective weight class; and
   selecting, by a processor, among all load estimation values, the load estimation value having the best current indication as estimation of the current load of the vehicle for the current driving situation and/or weighing the current indications for the weight classes to obtain an overall load estimation value for the filter bank, wherein the overall load estimation value is used as load estimation for the current load of the vehicle for the current driving situation.

2. The method of claim 1, wherein the
   supplying, to each filter, at least one vehicle data, and at least one current filter parameter;
   determining, by means of each filter, a load estimation value;
   determining, for each load estimation value, a current indication; and
   selecting, among all load estimation values, the mass estimation for which the best current indication is determined;
   are repeated.

3. The method of claim 2, wherein repetition of the supplying of the at least one vehicle data and the at least one current filter parameter, the determining of the load estimation value, the determining of the current indication, and the selecting of the mass estimation is carried out in predefined time intervals and/or each time the actual mass of the vehicle is to be estimated.

4. The method of claim 1, wherein each filter comprises at least one of a model-based filter, a Kalman filter, an extended Kalman filter, an unscented Kalman filter, a constraint extended Kalman filter, a particle filter, a sigma-point filter, point-mass filter, a grid-based filter.

5. The method of claim 1, wherein the vehicle model includes at least one of the following parameters:
   Gearbox efficiency ($\eta_{tm}$);
   engine torque (Te);
   gearbox damping constant ($\zeta$);
   engine angular velocity ($\omega_e$);
   engine inertia (Je);
   wheel angular velocity ($\omega_w$);
   wheel angular acceleration ($\dot{\omega}_w$);
   a gear ratio (ig);
   a final drive gear ratio (igf);
   wheel inertia (Je);
   air density ($\rho$);
   aerodynamic drag coefficient (Cd);
   vehicle aerodynamic front area (Af);
   vehicle speed (v);
   a previously determined load estimation value ($\hat{m}$) from the respective filter;
   a previously determined indication whether it can be assumed that the current load of the vehicle belongs to the respective weight class from the respective filter;
   the gravitational constant (g);
   rolling resistance coefficient (Cr); and
   wheel radius (r).

6. The method of claim 1, wherein supplying at least one vehicle data indicative of the current driving situation includes at least one of
   supplying an acceleration sensor value (y) indicating a current vehicle acceleration;
   supplying an engine torque value (Te) indicating a current torque generated by the vehicle's engine;
   supplying at least one wheel angular velocity value (ww) indicating a current angular velocity of at least one vehicle's wheel; and
   supplying an engine angular velocity value ($\omega_e$) indicating a current angular velocity of the vehicle's engine; and
   supplying a final drive ratio value (ifd) indicating a current final drive ratio.

7. The method of claim 1, wherein supplying at least one current filter parameter specific for the respective weight class includes supplying at least one the following filter parameters:
   a previous load estimation value of the respective filter;
   a previous mean of the respective filter;
   a previous covariance of the respective filter; and
   a previous probability of the respective filter.

8. The method of claim 7, wherein the previous covariance includes at least one of a covariance of a model error of the respective vehicle model and a covariance of measurement noise associated to the at least one vehicle data.

9. The method of claim 7, wherein
   the previous mean is an initial mean assumed for the respective vehicle model or is a mean of the respective vehicle model resulting from a previously carried out determining a load estimation value; and/or the previous covariance is an initial covariance assumed for the respective vehicle model or is a covariance of the respective vehicle model resulting from a previously carried out determining a load estimation value; and/or the previous probability is an initial probability assumed for the respective vehicle model or a probability of the respective vehicle model resulting from a previously carried out determining a current probability.

10. The method of claim 1, wherein determining a current probability that the actual mass of the vehicle belongs to the respective weight class includes using the Bayes' theorem.

11. The method of claim 1, wherein determining a current probability that the actual mass of the vehicle belongs to the respective weight class includes calculating the current probability on the basis of a likelihood of the respective load estimation value and a previously calculated probability of the respective weight class.

12. The method of claim 11, wherein the likehood of the respective load estimation value is determined on the basis of acceleration of the vehicle by exciting the respective vehicle model with at least two different loads of the vehicle wherein the actual vehicle's mass without load is known.

13. The method of claim 1, wherein determining a load estimation value includes determining a weight related function, for the respective vehicle model, of a residual between the current load of the vehicle and an load estimation value obtained from the respective vehicle model being excited with the current load of the vehicle.

14. The method of claim 1, wherein determining a load estimation value includes determining, for each vehicle model, an uncertainty for the respective load estimation value.

15. The method of claim 1, wherein the uncertainty is determined by at least one of:
an operational mode of a gearbox of the vehicle;
acceleration magnitude; and
engine torque magnitude.

16. The method of one of the preceding claims claim 1, wherein the vehicle model includes a model for the vehicle's acceleration and a model for a vehicle acceleration value provided by a sensor means of the vehicle, the vehicle acceleration value indicating a current acceleration of the vehicle.

17. The method of claim 16, wherein the model for the vehicle's acceleration is based on the following equation:

$$\left(\frac{\eta_{tm}(T_{et} - \zeta\omega_{et}) \cdot i_t}{r} - \frac{\rho C_d A_f}{2} v_t^2\right) / \hat{m}_t \gamma_m - g C_r / \gamma_m$$

wherein
$\eta_{tm}$ is a Gearbox efficiency;
Te is a current engine torque;
$\zeta$ is a gearbox damping constant;
$\omega_e$ is a current engine angular velocity;
it is the product of a current gear ratio and a current final drive gear ratio;
$\rho$ is a current air density:
Cd is an aerodynamic drag coefficient;
Af is the vehicle's aerodynamic front area;
v is the current vehicle speed;
$\hat{m}$ is a previously estimated vehicle load;
$\gamma_m$ is a mass factor for acceleration of the vehicle;
g is the gravitational constant;
Cr is a rolling resistance coefficient; and
r is a current wheel radius.

18. The method of claim 16 or 17, wherein the model for the vehicle acceleration value is based on the following equation:

$$\dot{v} + g \sin \alpha/\epsilon_m + g C_r \gamma_m$$

wherein
$\dot{v}$ is the vehicle acceleration;
g is the gravitational constant;
$\alpha$ is an angle between the sensor means' measurement axis and the earth's gravity field;
$C_r$ is a rolling resistance coefficient; and
$\gamma_m$ is a mass factor for acceleration of the vehicle.

19. The method of claim 16, wherein the model for the output of a sensor means is based on the following equation:

$$y_{acc} + g C_r / \gamma_m$$

wherein
$y_{acc}$ is a measured acceleration of the vehicle;
g is the gravitational constant;
$C_r$ is a rolling resistance coefficient; and
$\gamma_m$ is a mass factor for acceleration of the vehicle.

20. The method of claim 16, wherein the mass factor y is represented by:

$$1 + \frac{J_{dl}}{m} + \frac{J_e * i_t^2}{m}$$

wherein
m is the current mass of the vehicle;
$J_{dl}$ is the driveline inertia;
$J_e$ is the engine inertia;
it is the product of a current gear ratio and a current final drive gear ratio.

21. An apparatus for estimation of the current load of a vehicle, comprising:
a filter bank including at least two filters, each filter implementing a vehicle model for estimating the mass of the vehicle and being associated to one of at least two weight classes;
an input for supplying, to each filter, at least one vehicle data indicative of a current driving situation of the vehicle, and at least one current filter parameter specific for the respective weight class; wherein
each filter is adapted to determine a load estimation value as filter specific estimation of the current load of the vehicle;
a processing system to determine, for each load estimation value, a current indication whether it can be assumed that the current load of the vehicle belongs to the respective weight class, and select, among all load estimation values, the load estimation value for which the best current indication is determined as estimation of the current load of the vehicle for the current driving situation and/or being adapted to weigh the current indications for the weight classes to obtain an overall load estimation value for the filter bank, wherein the overall load estimation value is used as load estimation for the current load of the vehicle for the current driving situation.

22. The apparatus of claim 21, wherein each filter comprises at least one of a model-based filter, a Kalman filter, an extended Kalman filter, an unscented Kalman filter, a constraint extended Kalman filter, a particle filter, a sigma-point filter, point-mass filter, a grid-based filter.

23. The apparatus of claim 21, wherein the input for supplying at least one vehicle data comprises at least one of an input for receiving an acceleration sensor value (y) indicating a current vehicle acceleration provided by a vehicle sensor;

an input for receiving an engine torque value (Te) indicating a current torque generated by the vehicle's engine; and an input for receiving at least one wheel angular velocity value (ww) indicating a current angular velocity of at least one vehicle's wheel;

an input for receiving an engine angular velocity value ($\omega_e$) indicating a current angular velocity of the vehicle's engine; and an input for receiving a final drive ratio value (ifd) indicating a current final drive ratio.

24. A non-transitory computer program product comprising program code for carrying out a method, when executed on a processing system, of estimating the current load of a vehicle, comprising:

defining at least two weight classes;

providing a filter bank including, for each of the at least two weight classes, a filter, each filter implementing a vehicle model for estimating the current mass of the vehicle;

supplying, to each filter, at least one vehicle data indicative of a current driving situation of the vehicle, and at least one current filter parameter specific for the respective weight class;

determining, by means of each filter, a load estimation value as filter specific estimation of the current load of the vehicle;

determining, for each load estimation value, a current indication whether it can be assumed that the current load of the vehicle belongs to the respective weight class; and selecting, among all load estimation values, the load estimation value having the best current indication as estimation of the current load of the vehicle for the current driving situation and/or weighing the current indications for the weight classes to obtain an overall load estimation value for the filter bank, wherein the overall load estimation value is used as load estimation for the current load of the vehicle for the current driving situation.

25. The non-transitory computer program product of claim 24, comprising program code for carrying out, when executed on a processing system, a method of estimating the current load of a vehicle, wherein the supplying, to each filter, at least one vehicle data, and at least one current filter parameter;

determining, by means of each filter, a load estimation value;

determining, for each load estimation value, a current indication; and selecting, among all load estimation values, the mass estimation for which the best current indication is determined;

are repeated.

26. The non-transitory computer program product of claim 24 being stored on a computer readable storage medium or being stored in a storage of a processing system.

* * * * *